United States Patent
Wong et al.

(10) Patent No.: US 12,058,308 B2
(45) Date of Patent: *Aug. 6, 2024

(54) APERTURE HEALTH MONITORING MODE

(71) Applicant: Waymo LLC, Mountain View, CA (US)

(72) Inventors: Andy Wong, Mountain View, CA (US); Nirav Dharia, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/937,900

(22) Filed: Oct. 4, 2022

(65) Prior Publication Data
US 2023/0022201 A1 Jan. 26, 2023

Related U.S. Application Data

(63) Continuation of application No. 17/121,861, filed on Dec. 15, 2020, now Pat. No. 11,496,728.

(51) Int. Cl.
*H04N 17/00* (2006.01)
*B08B 1/14* (2024.01)
(Continued)

(52) U.S. Cl.
CPC .......... *H04N 17/002* (2013.01); *B08B 1/143* (2024.01); *B08B 3/04* (2013.01); *B08B 5/02* (2013.01);
(Continued)

(58) Field of Classification Search
CPC ...... H04N 17/002; H04N 7/18; H04N 23/672; H04N 23/81; H04N 25/61; H04N 7/183;
(Continued)

(56) References Cited

U.S. PATENT DOCUMENTS 9,167,152 B2 10/2015 Inoue et al.
9,843,735 B2 12/2017 Okazawa
(Continued)

FOREIGN PATENT DOCUMENTS

CN 105120154 A 12/2015
CN 109246349 A 1/2019
(Continued)

OTHER PUBLICATIONS

De Cristóforis et al., "Real-time monocular image-based path detection," J Real-Time Image Proc., Jun. 22, 2013, 14 pages.
(Continued)

*Primary Examiner* — Michael E Teitelbaum
(74) *Attorney, Agent, or Firm* — McDonnell Boehnen Hulbert & Berghoff LLP

(57) ABSTRACT

The present disclosure relates to systems, vehicles, and methods for detecting optical defects in an optical path of a camera system. An example system may include an image sensor configured to provide images of a field of view via an optical path that extends through an optical window. The system also includes at least one phase-detection device and a controller. The controller is configured to execute instructions stored in the memory so as to carry out various operations, including receiving, from the image sensor, first pixel information indicative of an image of the field of view. The operations additionally include receiving, from the at least one phase-detection device, second pixel information indicative of a portion of the field of view. The operations yet further include determining, based on the first pixel information and the second pixel information, at least one optical defect associated with the optical path.

20 Claims, 9 Drawing Sheets

(51) Int. Cl.
| | |
|---|---|
| *B08B 3/04* | (2006.01) |
| *B08B 5/02* | (2006.01) |
| *B08B 13/00* | (2006.01) |
| *G06T 7/00* | (2017.01) |
| *H04N 7/18* | (2006.01) |
| *H04N 23/67* | (2023.01) |

(52) U.S. Cl.
CPC ............ *B08B 13/00* (2013.01); *G06T 7/0002* (2013.01); *H04N 7/18* (2013.01); *H04N 23/672* (2023.01)

(58) Field of Classification Search
CPC .. B08B 1/006; B08B 3/04; B08B 5/02; B08B 13/00; G06T 7/0002; G06T 2207/30236; G06T 7/0004; G06T 2207/30252; G02B 7/34; G02B 27/0006; G06V 10/25; G06V 10/98; G06V 20/56
See application file for complete search history.

(56) References Cited

U.S. PATENT DOCUMENTS

| | | | |
|---|---|---|---|
| 10,440,301 B2 | 10/2019 | Li et al. | |
| 10,760,957 B2 | 9/2020 | Pacala et al. | |
| 2002/0121652 A1 | 9/2002 | Yamasaki | |
| 2006/0146178 A1 | 7/2006 | Ishiga | |
| 2009/0041377 A1* | 2/2009 | Edgar ................ | G06V 10/273 382/274 |
| 2009/0238553 A1 | 9/2009 | Tamura | |
| 2014/0028896 A1 | 1/2014 | Oshima | |
| 2015/0009296 A1 | 1/2015 | Crona | |
| 2017/0090149 A1 | 3/2017 | Galor Gluskin et al. | |
| 2017/0136962 A1 | 5/2017 | Morita et al. | |
| 2019/0124232 A1 | 4/2019 | Herman | |
| 2019/0130591 A1 | 5/2019 | Tanaka | |
| 2019/0289173 A1 | 9/2019 | Campbell et al. | |
| 2019/0373180 A1 | 12/2019 | Tomosada et al. | |
| 2019/0394406 A1 | 12/2019 | Shimizu | |
| 2020/0045237 A1 | 2/2020 | Miyazawa | |
| 2020/0092489 A1 | 3/2020 | Inagaki | |
| 2020/0120298 A1 | 4/2020 | Takahashi | |
| 2020/0133254 A1 | 4/2020 | Cella et al. | |
| 2020/0142073 A1 | 5/2020 | Gassend et al. | |
| 2020/0177872 A1 | 6/2020 | Herman et al. | |
| 2020/0228793 A1 | 7/2020 | Handa et al. | |
| 2020/0236292 A1 | 7/2020 | Miyazawa | |
| 2020/0242788 A1 | 7/2020 | Jacobs et al. | |
| 2020/0396400 A1 | 12/2020 | Takahashi | |
| 2021/0179031 A1 | 6/2021 | Vitanov | |

FOREIGN PATENT DOCUMENTS

| | | |
|---|---|---|
| JP | 2009105358 A | 5/2009 |
| JP | 2009271428 A | 11/2009 |
| JP | 2010014981 A | 1/2010 |
| JP | 2011194965 | 10/2011 |
| JP | 2019161583 A | 9/2019 |
| KR | 20190137733 A | 12/2019 |
| WO | 2019/167482 A1 | 9/2019 |
| WO | 2019/230217 A1 | 12/2019 |

OTHER PUBLICATIONS

International Searching Authority, International Search Report and Written Opinion mailed on Dec. 28, 2021, issued in connection with International Patent Application No. PCT/US2021050214, filed on Sep. 14, 2021, 9 pages.

Yu et al., "A Study on Recent Developments and Issues with Obstacle Detection Systems for Automated Vehicles," Sustainability, 2020, 26 pages, vol. 12.

* cited by examiner

APERTURE HEALTH MONITORING MODE

CROSS-REFERENCE TO RELATED APPLICATION

The present application is a continuation of U.S. patent application Ser. No. 17/121,861, filed Dec. 15, 2020, the content of which is herewith incorporated by reference.

BACKGROUND

Sensor systems, such as image capture devices (e.g., cameras) and/or light detection and ranging (LIDAR or Lidar) devices may be affected by optical defects within various optical paths associated with such systems. Optical defects can include, for example, rain, dust, cracks, or other occluding elements in the optical path. Conventional cleaning systems, such as wipers and/or fluid jets can be utilized to mitigate some optical defects. However, systems and methods that can automatically and more efficiently detect and reduce or eliminate the effect of optical defects are desired.

SUMMARY

The present disclosure relates to camera systems and related methods that may provide ways to detect and automatically mitigate the effects of optical defects. In some examples, such camera systems could include optical systems configured to be utilized with self-driving vehicles.

In a first aspect, a system is provided. The system includes an image sensor configured to provide images of a field of view via an optical path. The optical path extends through an optical window. The system includes at least one phase-detection device. The system also includes a controller. The controller includes at least one processor and a memory. The at least one processor is configured to execute instructions stored in the memory so as to carry out operations. The operations include receiving, from the image sensor, first pixel information indicative of an image of the field of view. The operations also include receiving, from the at least one phase-detection device, second pixel information indicative of a portion of the field of view. The operations include determining, based on the first pixel information and the second pixel information, at least one optical defect associated with the optical path.

In a second aspect, a vehicle is provided. The vehicle includes a camera system. The camera system includes an image sensor configured to provide images of a field of view via an optical path. The optical path extends through an optical window. The camera system also includes at least one phase-detection device. The camera system additionally includes a controller that includes at least one processor and a memory. The at least one processor is configured to execute instructions stored in the memory so as to carry out operations. The operations include receiving, from the image sensor, first pixel information indicative of an image of the field of view. The operations also include receiving, from the at least one phase-detection device, second pixel information indicative of a portion of the field of view. The operations also include determining, based on the first pixel information and the second pixel information, at least one optical defect associated with the optical path.

In a third aspect, a method is provided. The method includes receiving, from an image sensor, first pixel information indicative of an image of a field of view captured by the image sensor via an optical path. The method additionally includes receiving, from at least one phase-detection pixel, second pixel information indicative of a portion of the field of view. The method also includes determining, based on the first pixel information and the second pixel information, at least one optical defect associated with the optical path.

Other aspects, embodiments, and implementations will become apparent to those of ordinary skill in the art by reading the following detailed description, with reference where appropriate to the accompanying drawings.

DETAILED DESCRIPTION

Figure 1:
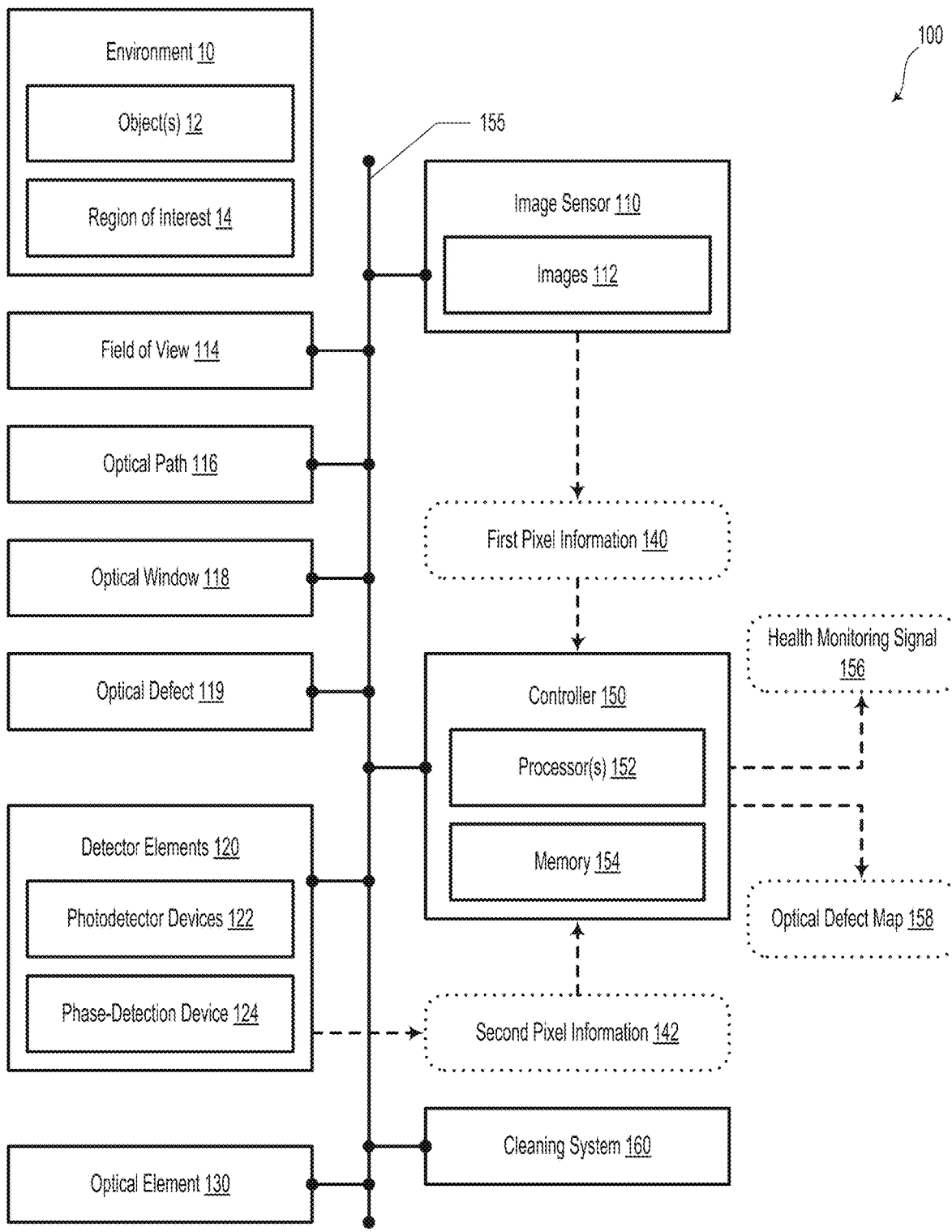
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A camera system of an autonomous or semi-autonomous vehicle may be exposed to environmental conditions such as rain, snow, etc. Such a camera system may also be exposed to dirt, mud, dust, etc. Accordingly, such systems may benefit from an optical monitoring system configured to detect contamination due to rain or "crud" in an optical path (e.g., aperture) of the image sensor. In some examples, the optical monitoring system could 1) inform a perception system of a possibly degraded image from the camera system; 2) activate a cleaning system; and/or 3) determine whether the cleaning system routine is/was effective to resolve the contamination issue.

Some or all of such functions could be performed separately from a primary vehicle perception system. For example, the system could include a local controller (e.g., an ASIC or FPGA) that could be coupled directly to the image sensor. In such scenarios, the local controller could beneficially reduce consumption of computing resources in the vehicle perception system, potentially freeing up resources for other tasks and functions. Furthermore, by handling various functions at the local controller, example embodiments described herein may reduce latency due to communication bandwidth and/or computation bandwidth.

In various examples, systems and methods may assist in determining a degraded image by directly measuring an extent of defocusing within the image. For example, the image sensor could include dedicated or shared phase-detection pixels configured to measure levels of defocusing, such as from a water droplet. In such embodiments, phase detection pixels could be utilized to calculate a phase difference, which may be beneficial to identify a presence or an absence of water drops and/or other occlusions on the optical window or elsewhere in the optical path. In such scenarios, measurement of the phase could provide an additional dimension of data that could aid the classification of dirt, water, dust, etc. Furthermore, direct phase measurements could reduce latency of such determinations compared to methods that include, for example, image processing and/or object recognition. Such phase measurements may also operate at a higher speed than full-resolution image acquisition.

As described herein, smart processing could be performed by the local controller based on standard pixel data. In such scenarios, subsampling (e.g., obtaining pixel data from a subset of pixels of the image sensor) could be utilized to detect water drops or stuck/dark pixels due to persistent occlusions or defects.

In various examples, the data product could be a two-dimensional processed "crud" map, or an abstracted one-dimensional health monitoring signal. For example, the health monitoring signal may be based on the amount of occlusions and/or defects in the optical path (e.g., field of view) or image sensor.

In some embodiments, the data products could be computed by the primary perception system using the raw underlying data-streams from the image sensor. Alternatively, the data products could be computed "at the edge" by at a "smart sensor" computing device. Such dedicated hardware could be configured to process the pixel data more efficiently, leading to lower latency. Furthermore, examples could beneficially utilize data aggregation that could reduce interconnect bandwidth requirements. In some embodiments, net power consumption may also be lower than using a generalized central computer.

II. Example Systems

FIG. 1 illustrates a system 100, according to an example embodiment. System 100 could include a camera system for capturing images of a scene. In specific embodiments, the optical system 100 could provide imaging functionality for a self-driving vehicle, a robot, or another type of vehicle configured to navigate its environment. For example, system 100 includes an image sensor 110 that may be configured to provide images 112 of a field of view 114 via an optical path 116. In such scenarios, the optical path 116 extends through an optical window 118. In some examples, the image sensor 110 could be configured to capture images of a field of view 114 of an environment 10 inside or outside a vehicle (e.g., vehicle 500).

In various embodiments, the system 100 could include a visible light camera. In such scenarios, the image sensor 110 could be configured to detect visible light wavelengths. In such embodiments, the image sensor 110 could be sensitive to wavelengths between approximately 380 nanometers to 700 nanometers.

Additionally or alternatively, the system 100 could be a thermal infrared camera (e.g., a thermographic imager). In such scenarios, the thermal infrared camera and the image sensor 100 could form images of a field of view of an environment of the camera using infrared light. In such embodiments, the image sensor 110 could be sensitive to wavelengths from approximately 1 micron to 14 microns. However, other wavelengths and wavelength ranges are possible and contemplated.

In some embodiments, the optical window 118 could be formed from various visible and/or infrared light-transmissive materials, such as glass, polycarbonate, silicon, germanium, etc. In some embodiments, the optical window 118 could be configured to be temperature-controllable (e.g., by way of a controllable heater element). In further examples, an outer surface of the optical window 118 could be disposed such that it is substantially flush with an outer surface of a housing. Such embodiments may provide improved ease of cleaning and/or maintenance.

The system 100 also includes at least one phase-detection device 124. In various examples, the at least one phase-detection device 124 includes at least one phase-detection auto-focus (PDAF) device. In examples embodiments, the PDAF device could include at least one of: a line-type autofocus sensor or a cross-type autofocus sensor.

The system 100 additionally includes a controller 150. The controller 150 includes at least one processor 152 and a memory 154. In some embodiments, the controller 150 could be communicatively coupled (e.g., wirelessly or wired) to various elements of system 100 by way of communication interface 155. For example, the controller 150 could be communicatively coupled to the image sensor 110, phase-detection device 124, and/or the cleaning system 160 in a wired or wireless manner by way of the communication interface 155.

The at least one processor 152 is configured to execute instructions stored in the memory 154 so as to carry out operations. The operations include receiving, from the image sensor 110, first pixel information 140 indicative of an image 112 of the field of view 114.

The operations also include receiving, from the at least one phase-detection device 124, second pixel information 142 indicative of a portion of the field of view.

The operations also include determining, based on the first pixel information 140 and the second pixel information 142, at least one optical defect 119 associated with the optical path 116.

In some embodiments, the image sensor 110 includes a plurality of detector elements 120. In such scenarios, the at least one phase-detection device 124 includes a subset of the plurality of detector elements 120.

In some examples, the second pixel information 142 could be indicative of an extent of defocusing of an object 12 in an environment 10 of the system 100. In such scenarios, determining the at least one optical defect 119 is based on the extent of defocusing of the object 12.

In various embodiments, system 100 may include at least one optical element 130 optically coupled to the at least one phase-detection device 124. The at least one optical element may include, for example, a microlens and/or an aperture plate.

In various examples, the operations of controller 150 could also include determining a health monitoring signal 156 based on the at least one optical defect 119. In such a scenario, the health monitoring signal 156 may include a one-dimensional representation of an occlusion level of the optical path 116.

Additionally or alternatively the operations of the controller 150 could also include determining an optical defect map 158 based on the at least one optical defect 119. The optical defect map 158 includes a two- or three-dimensional representation of the at least one optical defect 119.

In some examples, the operations could additionally include processing a portion of the first pixel information 140 that corresponds to a region of interest 14 within the field of view 114.

In various embodiments, the operations may also include comparing the second pixel information 142 to the region of interest 14 of the first pixel information 140. In such scenarios, determining the at least one optical defect 119 could be based on the comparison.

In some embodiments, the system 100 could also include a cleaning system 160 that is configured to clean the optical window 118 or another portion of the optical path 116. In such scenarios, the cleaning system 160 could include at least one of: a wiper system, a fluid cleaning system, or a high-pressure gas cleaning system.

In some embodiments, the system 100 may also be configured to carry out operations such as, in response to determining at least one optical defect 119, causing the cleaning system 160 to carry out a cleaning routine. In such scenarios, the operations could also include, subsequent to causing the cleaning system 160 to carry out the cleaning routine, determining an effectiveness of the cleaning routine.

Figure 2:
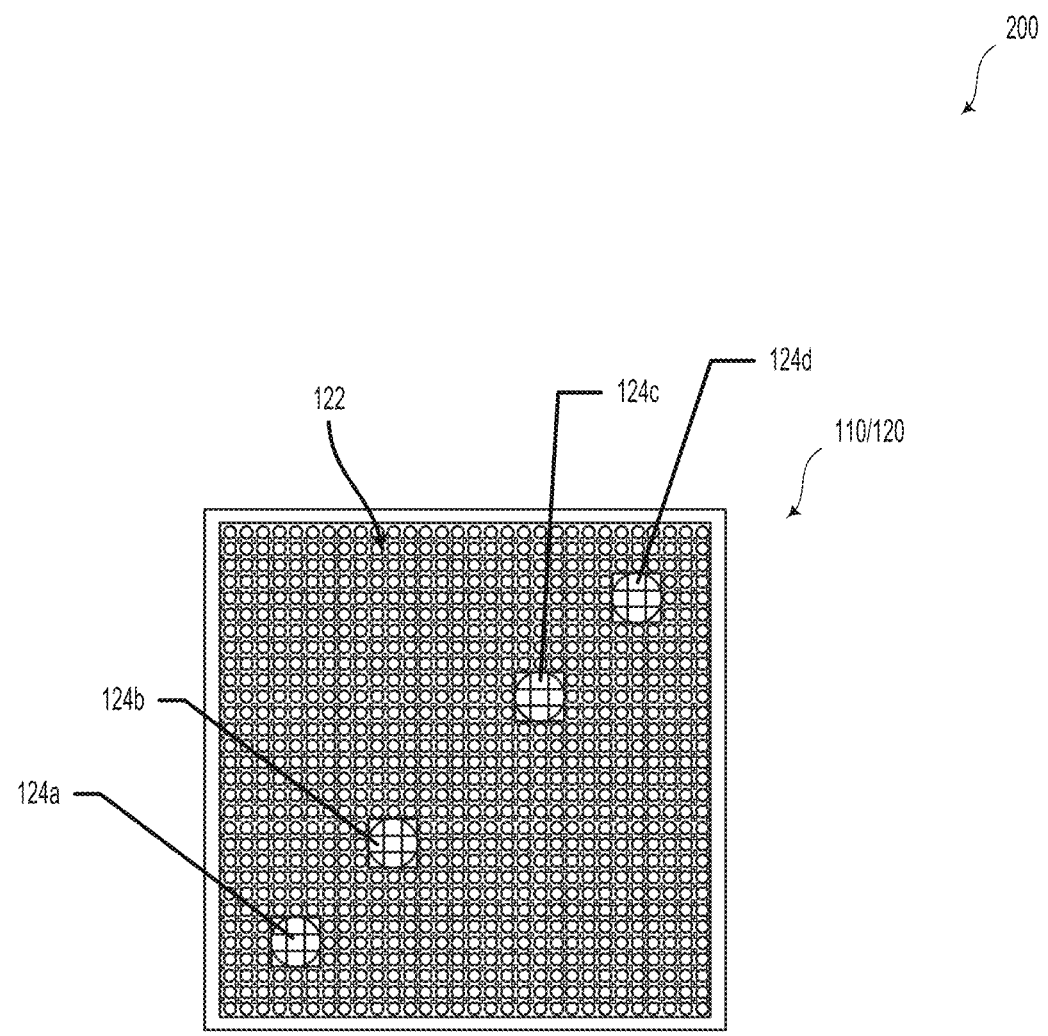
FIG. 2 illustrates detector elements of the system of FIG. 1, according to an example embodiment.

FIG. 2 illustrates detector elements 200 of the system 100 of FIG. 1, according to an example embodiment. As illustrated in FIG. 2, the detector elements 200 could include photodetector devices 122 as well as one or more phase-detection devices 124a, 124b, 124c, and 124d. In some embodiments, the detector elements 200 could make up the detector devices of the image sensor 110 or a portion of the image sensor 110. In an example embodiment, a plurality of phase-detection devices 124 (e.g., autofocus pixels) could be disposed in a variety of arrangements within the plurality of detector elements 200. For example, the phase-detection devices 124 could be placed across the array of detector elements 200 along a horizontal, vertical, and/or diagonal arrangement. Additionally or alternatively, the phase-detection devices 124 could be placed along the edge of the array of detector elements 200 (e.g., along each of the four sides of a rectangular or square array of detector elements). Yet further, the phase-detection devices 124 could be placed at one or more corners of the array of detector elements.

As described herein, detector elements 200 could each include one or more semiconductor junctions (e.g., a p-n junction photodiode) configured to convert photons into electrical charges and electrical current. In some examples, detector elements 200 could be disposed in a two-dimensional array (e.g., a rectangular or square array of detector elements 200). It will be understood that other arrangements of detector elements 200 are considered and possible. In some embodiments, the detector elements 200 could include an active-pixel sensor (APS) or a smart sensor. The smart sensor could combine the functionality of an image sensor and image processor in the same integrated circuit. In various embodiments, the smart sensor could include one or more processors in the same integrated circuit package.

In some embodiments, the detector elements 200 could include a passive-pixel sensor (PPS). In alternative examples, the detector elements 200 could include a charge coupled device (CCD) image sensor or a complementary metal oxide semiconductor (CMOS) image sensor.

Figure 3A:
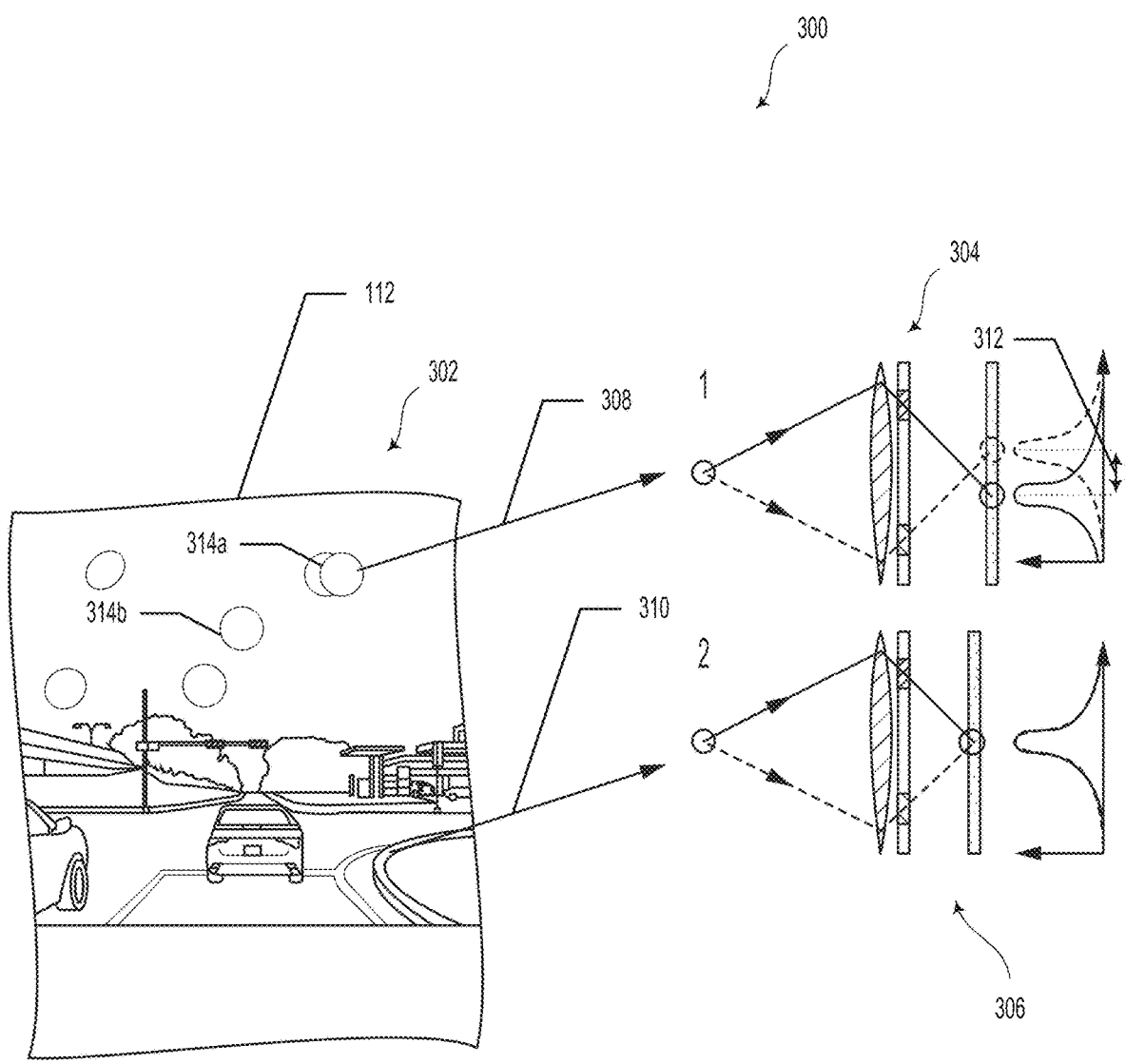
FIG. 3A illustrates a scenario involving the system of FIG. 1, according to an example embodiment.

FIG. 3A illustrates a scenario 300 involving the system of FIG. 1, according to an example embodiment. Scenario 300 could include an image 112 of a driving scenario. The image 112 could include "in-focus" objects (e.g., the various vehicles, building, trees, and traffic signal, etc.) and various "out-of-focus" objects (e.g., water droplets 314a and 314b, etc.).

In such a scenario, phase data may be provided from various regions of the image 112. For example, phase data 308 could be determined from a region of the image 112 that includes water droplet 314a. Schematic optical diagram 304 indicates that phase data 308 could include optical phase difference 312 that could correspond to the "out-of-focus" nature of the imaged object. In contrast, schematic optical diagram 306 indicates that phase data 310 could provide little or no corresponding optical phase difference due to, for example, the objects in the image region being substantially in focus. As described herein, the phase data 308 and 310 could be provided by phase-detection device(s) 124.

Figure 3B:
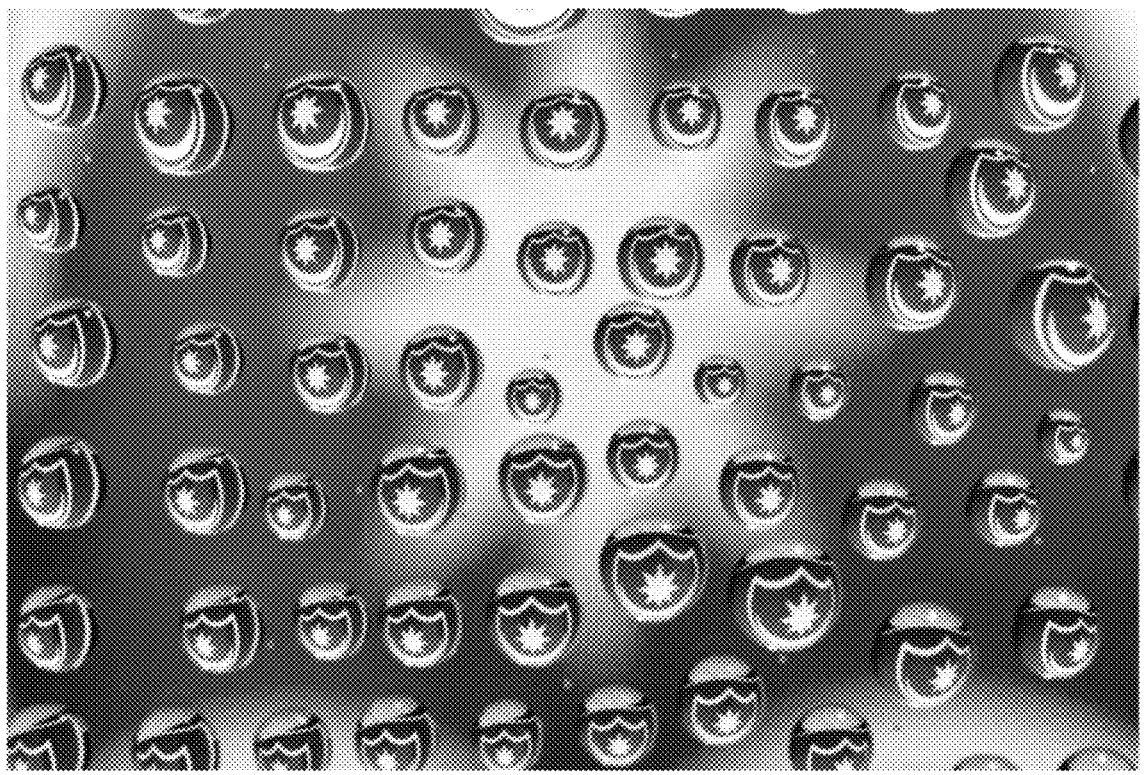
FIG. 3B illustrates an image, according to an example embodiment.

FIG. 3B illustrates an image 320, according to an example embodiment. The image 320 shows a plurality of in-focus water droplets along an optical element. In such an example, the optical element could include an optical window (e.g., optical window 118), a lens, or another optical component. In some scenarios, the water droplets could be considered as optical defects or occlusions that defocus and/or obscure a portion of the scene. For example, as illustrated, the focal distance and focal point of light from the object in the scene could differ from that of light that passes through the plurality of water droplets. As illustrated, the object could include a blue shield logo with star and crescent features. In such a scenario, the water droplets may act as a half convex lens by inverting the image of the object and foreshortening the focal distance of the object appearing in the water droplet.

Figure 4:
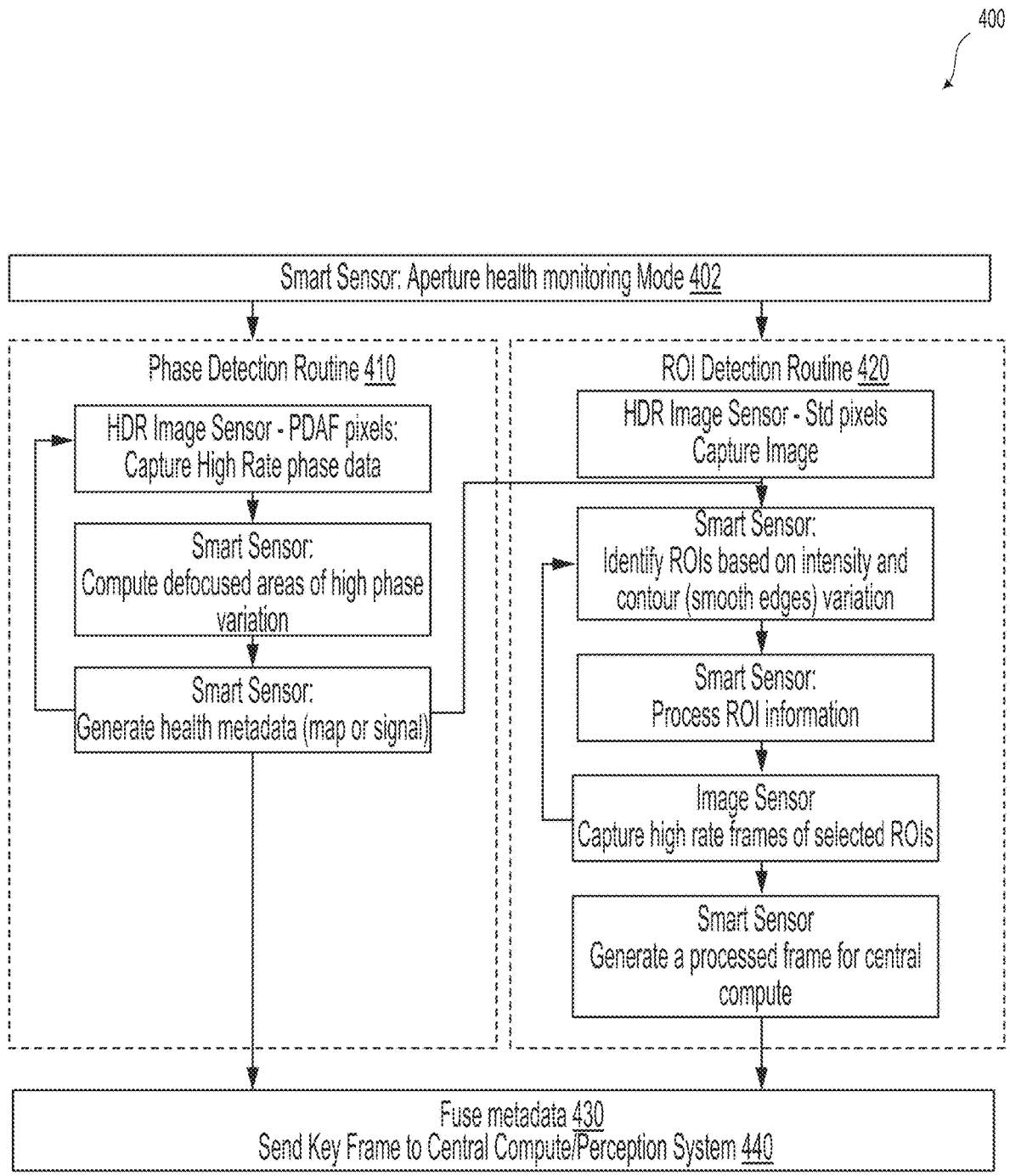
FIG. 4 illustrates a smart sensor flowchart, according to an example embodiment.
Figure 5A:
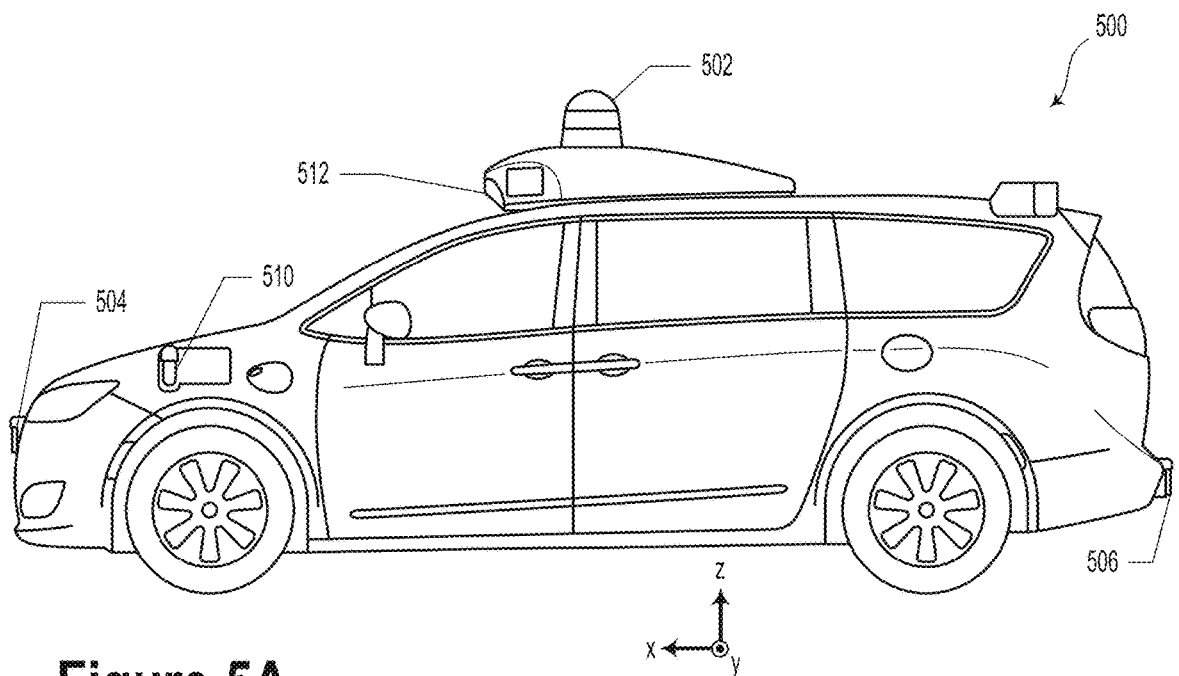
FIG. 5A illustrates a vehicle, according to an example embodiment.
Figure 5B:
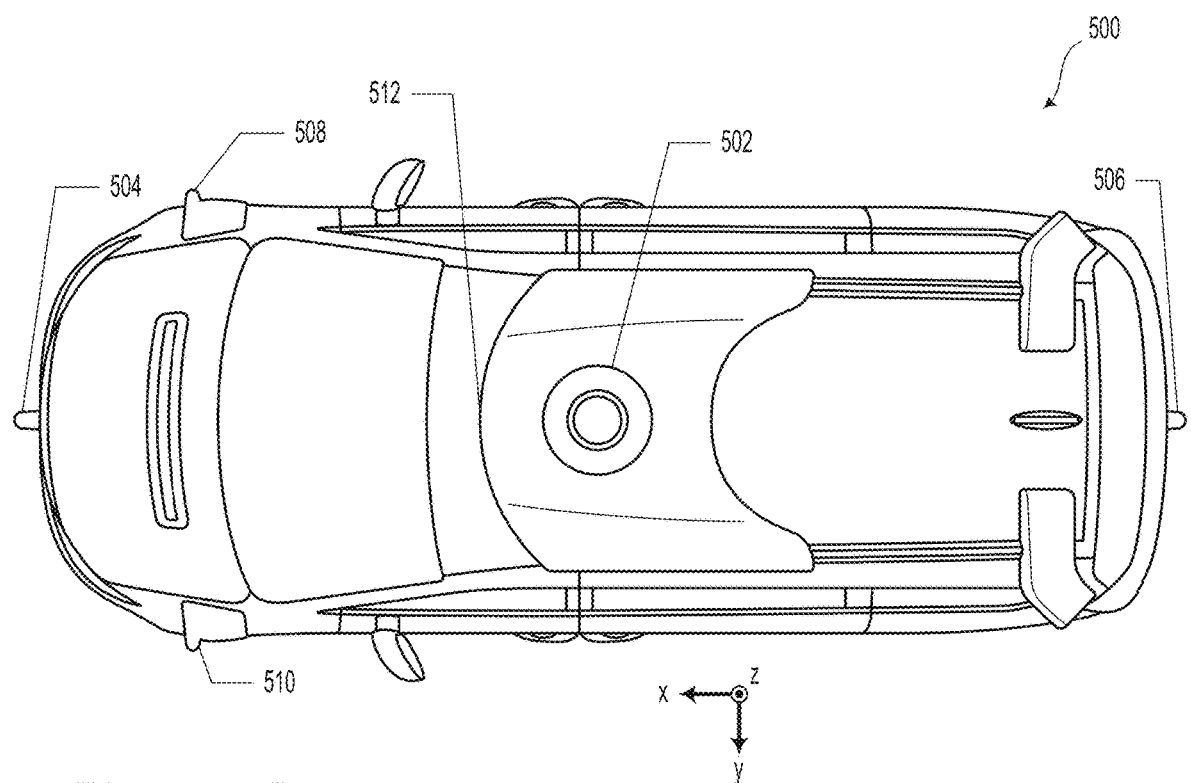
FIG. 5B illustrates a vehicle, according to an example embodiment.
Figure 5C:
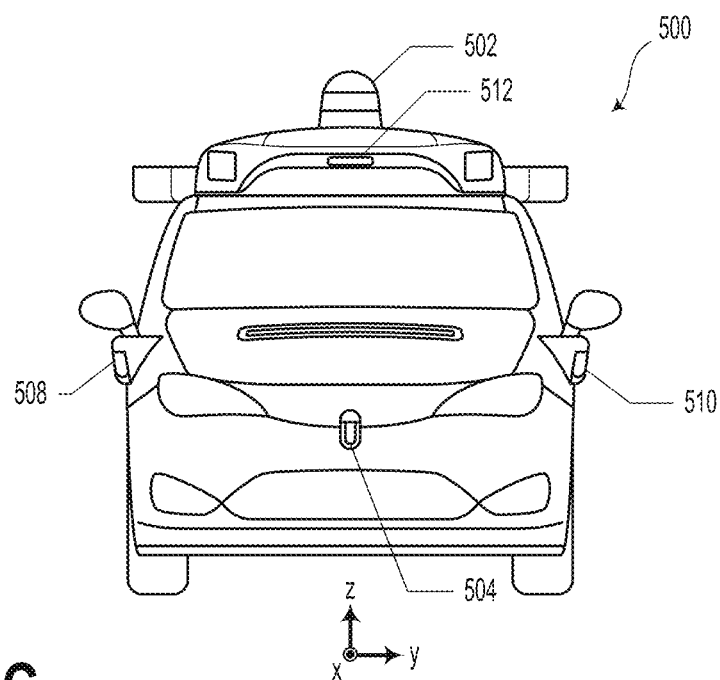
FIG. 5C illustrates a vehicle, according to an example embodiment.
Figure 5D:
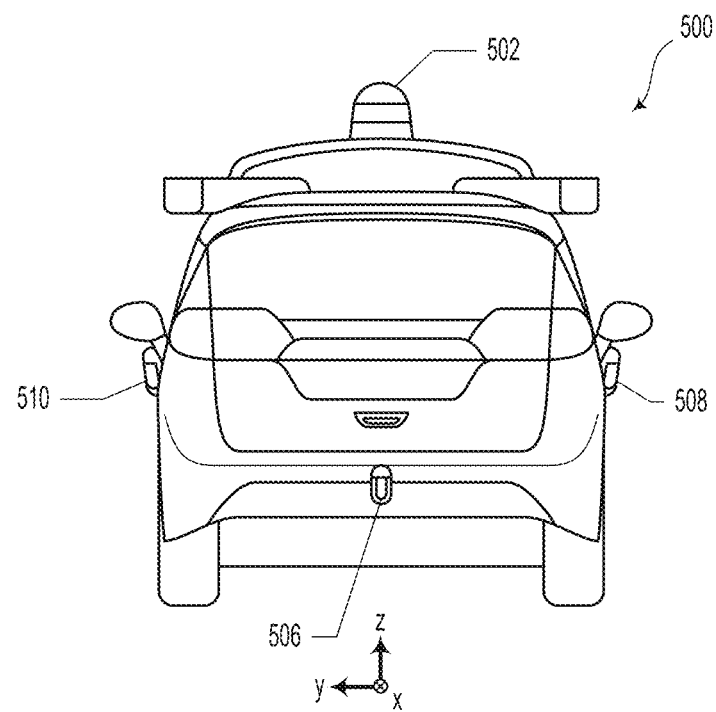
FIG. 5D illustrates a vehicle, according to an example embodiment.
Figure 5E:
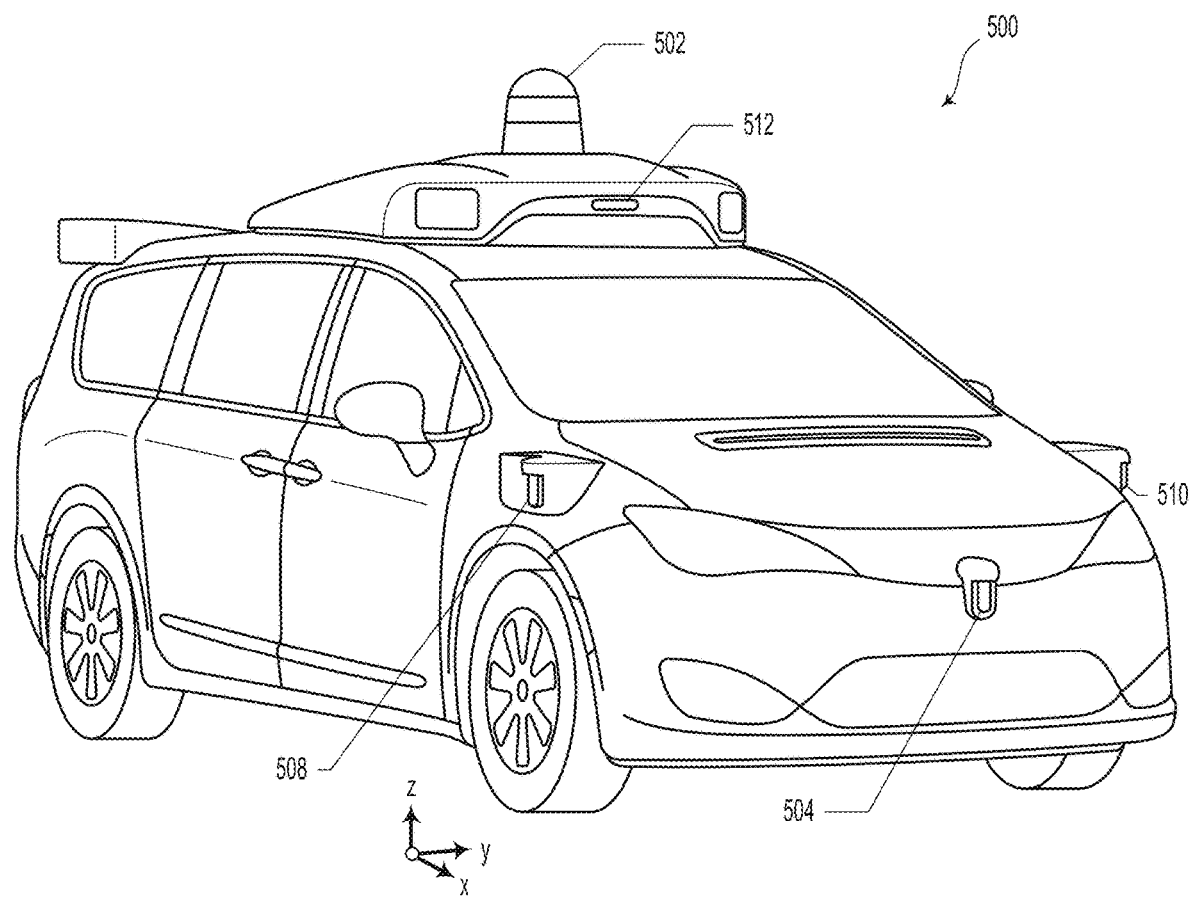
FIG. 5E illustrates a vehicle, according to an example embodiment.

FIG. 4 illustrates a smart sensor flowchart 400, according to an example embodiment. As illustrated, the smart sensor flowchart 400 could indicate functions that could be carried out by system 100, as illustrated and described in reference to FIG. 1. For example, the system 100 could include a smart sensor that may include the image sensor 110, the detector elements 120, and/or the controller 150. The smart sensor may be configured to carry out various functions separate from that of a perception computing system.

As an example, systems and methods described herein could include an aperture health monitoring mode 402. The aperture health monitoring mode 402 could be a standard software routine that may be executed in a parallel or serial fashion with other imaging functions of the system 100. In other examples, the aperture health monitoring mode 402 could be executed periodically (e.g., every 2, 5, 10, or 30 minutes) or on a demand or as-needed basis (e.g., triggered by a user and/or a central computing system or perception system).

The aperture health monitoring mode 402 could include two executable routines—a phase detection routine 410 and a region of interest (ROI) detection routine 420.

The phase detection routine 410 could include capturing, with a high-dynamic range (HDR) image sensor (e.g., image sensor 110 and/or detector elements 120), phase data about the scene. As described herein, the phase data could be provided, at least in part, by the phase-detection device(s) 124. As an example, phase data could include focus information about how light from the scene may interact with various occluding or refracting elements (e.g., optical defect 119) in the optical path (e.g., optical path 116). Such phase data could provide information indicative of optical phase differences (e.g., optical phase difference 312), which could indicate a position and/or an extent of an occluding or refracting element along the optical path.

The phase detection routine 410 could include the smart sensor determining, from the phase data, defocused regions. Determining such defocused regions could be based on information indicating high phase variation within a given region of the image.

The phase detection routine 410 could include generating a health metadata map or signal (e.g., health monitoring signal 156 or optical defect map 158) based on the number, extent, and/or an occluding nature of the determined defocused regions.

The ROI detection routine 420 could include capturing an image of a scene using the HDR image sensor. The ROI detection routine 420 could also include identifying one or more regions of interest (ROIs) based on an intensity and/or contour of image information from the scene. The ROI detection routine 420 may include processing the image information from the regions of interest and triggering high frame rate image capture of selected ROIs. The smart sensor ROI detection routine 420 may also include generating a processed frame that is based on the initial image and high frame rate ROI images.

The aperture health monitoring mode 402 could include fusing the metadata 403. Fusing the metadata 403 could include determining a key frame that is based on the processed frame as well as the health metadata (health monitoring signal 156 and/or the optical defect map 158). Determining the key frame could include adjusting the processed frame to correct, ignore, delete, or otherwise modify image information that corresponds to the defocused regions. The aperture health monitoring mode 402 could include transmitting the key frame to a central computing resource and/or a perception system resource 440.

It will be understood that other ways to modify HDR image information based on phase detection information are possible and contemplated within the context of the present disclosure.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could include system 100 as illustrated and described in relation to FIG. 1. In other words, the systems described elsewhere herein could be coupled to the vehicle 500 and/or could be utilized in conjunction with various operations of the vehicle 500. As an example, the system 100 could be utilized in self-driving or other types of navigation, planning, perception, and/or mapping operations of the vehicle 500.

In some examples, the one or more systems could be disposed in various locations on the vehicle 500 and could have fields of view that correspond to internal and/or external environments of the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

As described, in some embodiments, the one or more sensor systems 502, 504, 506, 508, 510, and/or 512 could include image sensors. For example, vehicle 500 could include a camera system (e.g., system 100) that includes an image sensor (e.g., image sensor 110) configured to provide images (e.g., images 112) of a field of view (e.g., field of view 114) via an optical path (e.g., optical path 116). The optical path extends through an optical window (e.g., optical window 118).

The camera system also includes at least one phase-detection device (e.g., phase-detection device 124) and a controller (e.g., controller 150). In such scenarios, the controller could include at least one processor and a memory. The at least one processor could be configured to execute instructions stored in the memory so as to carry out operations. In some embodiments, the operations could include receiving, from the image sensor, first pixel information (e.g., first pixel information 140) indicative of an image of the field of view.

The operations could also include receiving, from the at least one phase-detection device, second pixel information (e.g., second pixel information 142) indicative of a portion of the field of view. The operations may additionally include determining, based on the first pixel information and the second pixel information, at least one optical defect (e.g., optical defect 119) associated with the optical path.

In various examples, the image sensor includes a plurality of detector elements (e.g., detector elements 120). In such scenarios, the at least one phase-detection device could include a subset of the plurality of detector elements.

In some embodiments, the at least one phase-detection device includes at least one phase-detection auto-focus (PDAF) device. In such scenarios, the PDAF device could include at least one of: a line-type autofocus sensor or a cross-type autofocus sensor.

Additionally or alternatively the one or more sensor systems 502, 504, 506, 508, 510, and/or 512 could include lidar sensors. For example, the lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

IV. Example Methods

Figure 6:
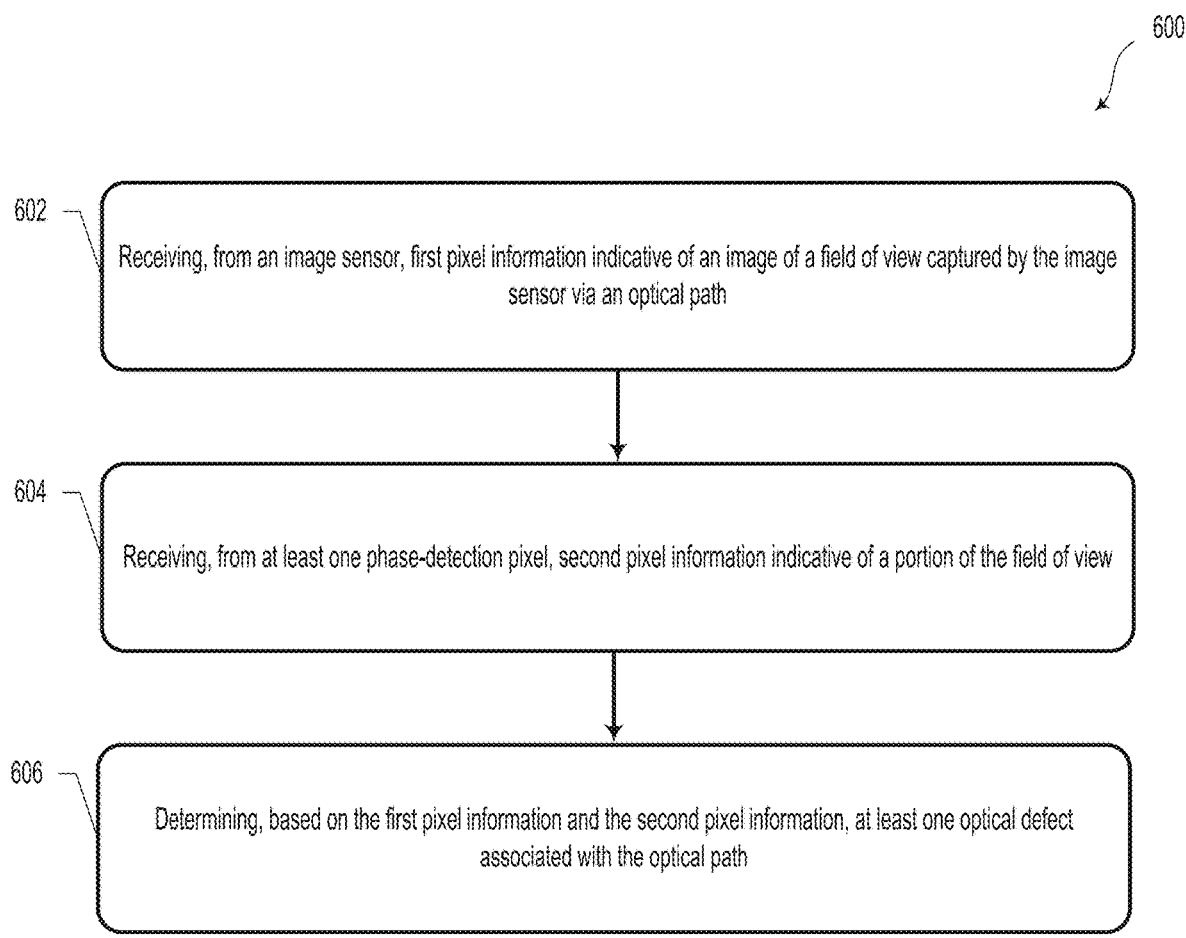
FIG. 6 illustrates a method, according to an example embodiment.

FIG. 6 illustrate steps or blocks of a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of system 100 as illustrated and described in relation to FIG. 1. Additionally or alternatively, some or all of the block or steps of method 600 may relate to a vehicle, such as vehicle 500 described and illustrated in reference to FIGS. 5A, 5B, 5C, 5D, and 5E.

Block 602 includes receiving, from an image sensor (e.g., image sensor 110), first pixel information (e.g., first pixel information 140), which may be indicative of an image (e.g., images 112) of a field of view (e.g., field of view 114) captured by the image sensor via an optical path (e.g., optical path 116).

Block 604 includes receiving, from at least one phase-detection pixel (e.g., phase-detection device 124), second pixel information (e.g., second pixel information 142) that may be indicative of a portion of the field of view.

Block 606 includes determining, based on the first pixel information and the second pixel information, at least one optical defect (e.g., optical defect 119) that is associated with the optical path.

In some embodiments, method 600 could additionally include determining a health monitoring signal (e.g., health monitoring signal 156) based on the at least one optical defect. In such scenarios, the health monitoring signal could include a one-dimensional representation of an occlusion level of the optical path or field of view. For example, the health monitoring signal could be represented by a value from zero to 100, where zero could represent a completely unobstructed field of view and 100 represents a completely obstructed or occluded field of view. A health monitoring signal with intermediate values (e.g., 33, 50, 82, etc.) could indicate partially occluded fields of view. It will be understood that other ranges, values, and/or representation types are possible and contemplated.

In some examples, method 600 could include determining an optical defect map (e.g., optical defect map 158) based on the at least one optical defect. In such scenarios, the optical defect map could include a two- or three-dimensional representation of the at least one optical defect. In an example embodiment, the optical defect map could include a two-dimensional array of values (e.g., 0, 1, or other values), that represent locations and/or regions that are occluded by optical defects within a given field of view. In such scenarios, the optical defect map could be utilized by a perception system of a self-driving vehicle (e.g., vehicle 500) to adjust one or more images provided by the image sensor to improve various perception tasks, such as detecting and/or disambiguating objects within the field of view. Additionally or alternatively, the optical defect map could be utilized to discount information from image pixels that correspond to optical defects within the field of view.

Alternatively or additionally, the optical defect map could take the form of a convolutional matrix, a kernel, and/or a mask. Such an optical defect map could be utilized by an image processing method to adjust one or more images provided by the image sensor. As an example, the optical defect map could be utilized to blur, sharpen, emboss, and/or detect edges within the one or more images. Other types of optical defect maps and image processing methods are possible and contemplated.

In various examples, method 600 could include, in response to the health monitoring signal and/or the optical defect map, activating a cleaning system (e.g., cleaning system 160). Additionally or alternatively, method 600 could include determining whether the cleaning system routine is/was effective to mitigate or otherwise resolve the optical defect issue. It will be understood that method 600 could include other actions that could help reduce the effect of optical defects that obscure a field of view of a camera system.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   an image sensor configured to provide images of a field of view via an optical path, wherein the optical path extends through an optical window;
   at least one phase-detection device; and
   a controller, wherein the controller comprises at least one processor and a memory, wherein the at least one processor is configured to execute instructions stored in the memory so as to carry out operations, the operations comprising:
      receiving, from the image sensor, first pixel information indicative of an image of the field of view;
      receiving, from the at least one phase-detection device, second pixel information indicative of a portion of the field of view and an extent of defocusing of an object in an environment;
      determining, based on the first pixel information and the second pixel information, at least one occluding element associated with the optical path, wherein determining the at least one occluding element is based on the extent of defocusing of the object in the environment; and
      determining an optical defect map based on the at least one occluding element, wherein the optical defect map comprises a two- or three-dimensional representation of the at least one occluding element.

2. The system of claim 1, wherein the image sensor comprises a plurality of detector elements, wherein the at least one phase-detection device comprises a subset of the plurality of detector elements.

3. The system of claim 1, wherein the at least one phase-detection device comprises at least one phase-detection auto-focus (PDAF) device.

4. The system of claim 1, wherein the operations further comprise determining a key frame based on the first pixel information and the optical defect map.

5. The system of claim 3, wherein the PDAF device comprises at least one of: a line-type autofocus sensor or a cross-type autofocus sensor.

6. The system of claim 1, further comprising at least one optical element optically coupled to the at least one phase-detection device, wherein the at least one optical element comprises: a microlens or an aperture plate.

7. The system of claim 1, wherein the operations further comprise:
   determining a health monitoring signal based on the at least one occluding element, wherein the health monitoring signal comprises a one-dimensional representation of an occlusion level of the optical path.

8. The system of claim 1, wherein the operations further comprise:
   adjusting, based on the optical defect map, one or more images of the field of view so as to: detect an object in the field of view; disambiguate an object in the field of view; or discount pixel information corresponding to the field of view.

9. The system of claim 1, wherein the operations further comprise:
   processing a portion of the first pixel information that corresponds to a region of interest within the field of view.

10. The system of claim 9, wherein the operations further comprise:
    comparing the second pixel information to the region of interest of the first pixel information, wherein determining the at least one occluding element is based on the comparison.

11. The system of claim 1, further comprising a cleaning system configured to clean the optical window, wherein the cleaning system comprises at least one of: a wiper system, a fluid cleaning system, or a high-pressure gas cleaning system.

12. The system of claim 11, wherein the operations further comprise:
    in response to determining the at least one occluding element, causing the cleaning system to carry out a cleaning routine.

13. The system of claim 12, wherein the operations further comprise:
    subsequent to causing the cleaning system to carry out the cleaning routine, determining an effectiveness of the cleaning routine.

14. The system of claim 1, wherein the controller comprises a smart sensor that is coupled directly to the image sensor and configured to carry out functions separate from a perception computing system.

15. A vehicle comprising:
    a camera system comprising:
       an image sensor configured to provide images of a field of view via an optical path, wherein the optical path extends through an optical window;
       at least one phase-detection device; and
       a controller, wherein the controller comprises at least one processor and a memory, wherein the at least one processor is configured to execute instructions stored in the memory so as to carry out operations, the operations comprising:
          receiving, from the image sensor, first pixel information indicative of an image of the field of view;
          receiving, from the at least one phase-detection device, second pixel information indicative of a portion of the field of view and an extent of defocusing of an object in an environment;
          determining, based on the first pixel information and the second pixel information, at least one occluding element associated with the optical path, wherein determining the at least one occluding element is based on the extent of defocusing of the object in the environment; and
          determining an optical defect map based on the at least one occluding element, wherein the optical defect map comprises a two- or three-dimensional representation of the at least one occluding element.

16. The vehicle of claim 15, wherein the image sensor comprises a plurality of detector elements, wherein the at least one phase-detection device comprises a subset of the plurality of detector elements.

17. The vehicle of claim 15, wherein the at least one phase-detection device comprises at least one phase-detection auto-focus (PDAF) device, wherein the PDAF device comprises at least one of: a line-type autofocus sensor or a cross-type autofocus sensor.

18. A method comprising:
receiving, from an image sensor, first pixel information indicative of an image of a field of view captured by the image sensor via an optical path;
receiving, from at least one phase-detection pixel, second pixel information indicative of a portion of the field of view and an extent of defocusing of an object in an environment;
determining, based on the first pixel information and the second pixel information, at least one occluding element associated with the optical path, wherein determining the at least one occluding element is based on the extent of defocusing of the object in the environment; and
determining an optical defect map based on the at least one occluding element, wherein the optical defect map comprises a two- or three-dimensional representation of the at least one occluding element.

19. The method of claim 18, further comprising:
determining a health monitoring signal based on the at least one occluding element, wherein the health monitoring signal comprises a one-dimensional representation of an occlusion level of the optical path.

20. The method of claim 18, further comprising:
adjusting, based on the optical defect map, one or more images of the field of view so as to: detect an object in the field of view; disambiguate an object in the field of view; or discount pixel information corresponding to the field of view.

* * * * *